Feb. 4, 1930.  E. THOMSON  1,746,204
ELECTRIC WELDING
Original Filed Aug. 26, 1925
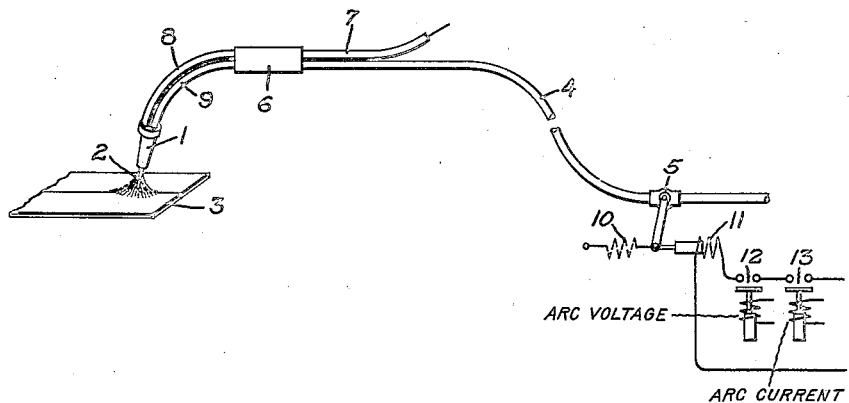
Inventor:
Elihu Thomson,
by Charles E. Tullar
His Attorney.

Patented Feb. 4, 1930

1,746,204

UNITED STATES PATENT OFFICE

ELIHU THOMSON, OF SWAMPSCOTT, MASSACHUSETTS, ASSIGNOR TO GENERAL ELECTRIC COMPANY, A CORPORATION OF NEW YORK

ELECTRIC WELDING

Original application filed August 26, 1925, Serial No. 52,680. Divided and this application filed July 18, 1929. Serial No. 379,290.

My invention relates to electric arc welding, and particularly to arc welding in gaseous media and has as an object the provision of means controlled by the arc for controlling automatically the supply of gaseous media to the arc in accordance with the condition of the arc.

The present application is a division of my application, Serial No. 52,680, filed August 26, 1925, for electric welding.

In my earlier application I have described and claimed methods of producing ductile welds in a gaseous medium composed entirely of carbon monoxide or a mixture of carbon monoxide and hydrogen. In accordance with the invention disclosed in that case the gaseous medium which surrounds the arc and excludes atmospheric air from the arc stream and the molten portions of the work is produced by mixing separate gases before they reach the arc or by decomposing a suitable medium at the arc to produce the desired atmosphere.

When carbon monoxide is supplied to the arc it is necessary because of its poisonous nature to use some means to protect the operator from its effects. According to my invention an automatic valve is provided in the supply line through which the gas or mixture of gases are conducted to the place of welding which turns on the gas or gases only when the welding arc is in operation. In this way danger to life is eliminated since while the arc is in operation the carbon monoxide burns to carbon dioxide which is harmless. My invention is not limited, however, to the control of poisonous gases such as carbon monoxide but is suitable for the control of other gases or substances which when fed to the arc produces the desired welding medium, for the purpose of enconomizing on the amount of material used or for preventing any danger or discomfiture arising out of supplying the material when the arc is not in operation.

The single figure of the drawing diagrammatically represents my invention applied to a semi-automatic arc welding machine.

The semi-automatic welding apparatus may be, for example, of the general type disclosed in Letters Patent to P. O. Noble No. 1,508,711, September 16, 1924. In this type of apparatus means are provided for automatically feeding the electrode to the work to maintain the arc. Since such means form no essential part of my invention they have not been shown in the figure. The figure shows an electrode delivery and gas discharge nozzle 1 through which an electrode 2 may be advanced towards the work 3 by suitable means such as shown in the above-referred to patent. The nozzle contains or has associated therewith a passageway adapted to be connected with the source of gas or vapor supply through a conduit 4 shown provided with an automatically controlled valve 5. The conduit leading to the welding tool may be a flexible hose. The part 6 of the tool may be held in the hand of the welder and may be provided with suitable switch contacts for controlling the welding circuit. Examples of such circuit controlling means are well known in the art. The electrode may be guided to the tool through a flexible guide tube 7 which may have the welding lead and control wires incorporated therein or secured thereto. The curved piece 8 of the tool may be a small pipe of brass or the like through which the electrode is fed and with which it makes good contact as it is forced around the curve. The part 9 of the tool is an extension of the conduit 4 and may be either a small piece of pipe or a piece of flexible hose which may be bound against the pipe 8.

In order to insure that gas is discharged at the nozzle 1 only during the welding operation, the valve 5 is biased to closed position by means of a spring 10 and is arranged to be operated to its open position in response to energization of a solenoid 11, the operating coil of which is supplied with current from any suitable source through relay switches 12 and 13. As indicated by the legends "Arc voltage" and "Arc circuit", the switches 12 and 13 are operated in accordance with the arc voltage and arc circuit, respectively. With this arrangement the solenoid is deenergized either when the arc is interrupted or when a short circuit is established between the work and the electrode thus insuring that the valve 5 is always closed when the gas is not utilized in producing a weld.

My invention is not limited to welding in a carbon monoxide or carbon monoxide and hydrogen atmosphere in connection with semi-automatic arc welding as above described but may be used for manual or fully automatic arc welding in the presence of gases or materials producing gases supplied to and about the point of welding. In manual arc welding the operator by the aid of a suitable electrode holder strikes and maintains the arc manually. In semi-automatic arc welding, as pointed out above in the patent to Noble No. 1,508,711, means are provided for automatically feeding the electrode to compensate for its consumption and in full automatic arc welding the electrode is not only automatically fed to compensate for its consumption but automatic means are provided for producing relative movement between the arc and the work along the line or joint to be welded. Furthermore, while my invention is particularly applicable in cases where metal is deposited from a fusible electrode, such as iron or steel electrodes, it is also applicable where a carbon electrode is used. My invention is also applicable in its broader aspect in arc welding systems in which the arc is maintained between a plurality of electrodes instead of between an electrode and the work to be welded and non-consuming electrodes may be used if desired.

The application of Irving Langmuir, Serial No. 729,185, filed July 30, 1924, for heating process and apparatus, assigned to the same assignee as the present application, discloses and claims method and apparatus for producing atomic hydrogen and carrying it over to the work where it is recombined, liberating heat. Whether or not heating of the work by the recombination of dissociated hydrogen may under certain circumstances be present to some extent when my invention is used, I make no claim to such subject matter since the Langmuir invention is earlier than my invention.

The embodiment of my invention illustrated and described herein has been selected for the purpose of setting forth the principles involved. It will be apparent, however, that the invention is susceptible of being modified to meet the different conditions encountered in its use and I, therefore, aim to cover by the appended claims all modifications within the true spirit and scope of my invention.

What I claim as new and desire to secure by Letters Patent of the United States is:

1. Apparatus for electric arc welding comprising means adapted to produce around the arc and in contact with the molten portions of the work a reducing gaseous medium and valve means controlled by the arc to control automatically the supply of medium in accordance with the condition of the arc.

2. Apparatus of the type wherein an electric arc is used to fuse metal work and wherein the arc is started and interrupted at the beginning and end of the operation and wherein means are provided for supplying a gaseous medium to surround the arc and play upon the molten portion of the work, characterized by the fact that valve means responsive to an electrical characteristic of the arc are provided for automatically controlling the supply of gaseous medium.

3. Apparatus for electric arc welding comprising means for maintaining an arc, means for supplying about the arc a gas producing medium, and valve means controlled by an electrical characteristic of said arc for controlling the supply of said medium to said arc.

4. Apparatus for electric arc welding comprising means for maintaining an arc, means for supplying about the arc a gas producing medium, and valve means controlled by the voltage of said arc for controlling the supply of said medium to said arc.

5. Apparatus for electric arc welding comprising means for maintaining an arc, means for supplying about the arc a gas producing medium, and valve means controlled by the welding current for controlling the supply of said medium to said arc.

6. Apparatus for electric arc welding comprising means for maintaining an arc, means for supplying about the arc a gas producing medium, and valve means controlled by the voltage and current of said arc for controlling the supply of said medium to said arc.

In witness whereof, I have hereunto set my hand, this 16th day of July, 1929.

ELIHU THOMSON.